United States Patent
Ota et al.

(10) Patent No.: US 6,619,450 B2
(45) Date of Patent: Sep. 16, 2003

(54) TRANSMISSION

(75) Inventors: Atsuo Ota, Saitama (JP); Hiroshi Ohri, Saitama (JP); Satoru Narita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 155 days.

(21) Appl. No.: 09/820,000

(22) Filed: Mar. 29, 2001

(65) Prior Publication Data

US 2001/0025755 A1 Oct. 4, 2001

(30) Foreign Application Priority Data

Mar. 29, 2000 (JP) .......................... 2000-091164

(51) Int. Cl.⁷ .................... B60K 20/02; B60K 41/22; F16H 59/00
(52) U.S. Cl. .................. 192/3.56; 74/337.5; 192/3.63
(58) Field of Search ............... 192/3.56, 3.61, 192/3.63; 74/337.5, 339

(56) References Cited

U.S. PATENT DOCUMENTS

| | | | | |
|---|---|---|---|---|
| 5,934,234 A | * | 8/1999 | Shichinohe et al. | 123/90.31 |
| 5,975,041 A | * | 11/1999 | Narita et al. | 123/196 R |
| 5,992,355 A | * | 11/1999 | Shichinohe et al. | 123/41.56 |
| 6,085,607 A | * | 7/2000 | Narita et al. | 192/3.56 |
| 6,095,004 A | * | 8/2000 | Ota et al. | 74/337.5 |
| 6,117,046 A | * | 9/2000 | Ota et al. | 477/79 |
| 6,341,680 B1 | * | 1/2002 | Ota et al. | 192/3.55 |
| 6,370,977 B1 | * | 4/2002 | Kubo et al. | 74/339 |
| 6,443,275 B1 | * | 9/2002 | Hori et al. | 192/3.61 |

FOREIGN PATENT DOCUMENTS

| JP | 6240349 | 3/1987 |
|---|---|---|
| JP | A1182710 | 3/1999 |

* cited by examiner

*Primary Examiner*—Rodney H. Bonck
(74) *Attorney, Agent, or Firm*—Birch, Stewart, Kolasch & Birch, LLP

(57) ABSTRACT

A transmission for changing a ratio of a rotational number of a power source and a rotational number of an output shaft by shifting a gear train provided between the power source and the output shaft by moving a shift fork. The transmission includes a shift drum for moving the shift fork, a clutch provided between the power source and the gear train, a shift spindle for urging the shift drum and the clutch. When the shift spindle is pivoted, lift of a clutch is started by pivoting a clutch arm. In accordance with pivoting the shift spindle, a sub arm is pivoted and preload is applied on a master arm by a preload spring. Thereafter, when the sub arm is further pivoted, the master arm follows the sub arm and a shift drum is pivoted via index pins. Since the preload is applied, when the clutch is disengaged, the shift drum is pivoted immediately, a shift fork is displaced and gears are switched.

21 Claims, 4 Drawing Sheets

TRANSMISSION

BACKGROUND OF THE INVENTION

1. Technical Field

The present invention relates to a transmission, particularly to a transmission capable of switching a transmission gear swiftly in response to operation of disengaging a clutch.

2. Background Art

There is known a transmission for engaging a shift fork to a cam groove formed at a surrounding of a shift drum and switching mesh of gear by moving the shift fork by pivoting the shift drum. In moving the shift fork, it is necessary to cut a power transmission path between a power source and a transmission of a vehicle and a clutch mechanism is adopted therefor. In recent years, there is known an electric transmission for cutting a power transmission mechanism by a clutch mechanism and driving a shift drum by a single motor (for example, refer to Japanese Unexamined Patent Publication No. H11-82710).

The electric transmission is provided with a change spindle for driving an arm (master arm) for intermittently pivoting the shift drum. The change spindle is also coupled with a clutch lever for disengaging and engaging a clutch. In operating thereof, when the change spindle is rotated by a predetermined angle, the clutch is disengaged via the clutch arm and when the change spindle is rotated further from the position, the shift drum is rotated, the shift fork is displaced and mesh of gear is shifted.

Conventionally, the shift drum is not rotated until the clutch is disengaged after the change spindle is rotated by the predetermined angle. Therefore, a time period from start of shift operation until the gear is shifted actually is prolonged. Further, a dowel is formed in a connecting member for connecting gears moved by the shift fork, slits with which the dowel engages are formed at the gears and a transmission gear ratio is determined by to which slits of gear the dowel of the connecting member is coupled.

The dowel and the slits are provided with a structure in which the dowel and the slit are smoothly coupled when the clutch is disengaged and rotation by inertia is continued. However, in the conventional apparatus for rotating the shift drum after the clutch is disengaged, a time period from when the clutch is disengaged until operation of coupling the dowel and the slit is reached, is long. Therefore, the inertia is small, the dowel and the slit are difficult to couple and the gear may not be shifted smoothly.

There is proposed a shift mechanism in which prior to shift operation the shift fork is urged in a direction of displacing the shift fork by a spring (refer to Japanese Unexamined Utility Model Publication No. S62-40349, Japanese Unexamined Patent Publication No. H5-203048. However, according to these shift mechanisms, the shift drum is not used but the shift fork is directly driven and therefore, a motor must be provided exclusively for driving the shift fork.

SUMMARY OF THE INVENTION

It is an object of the present invention to resolve the above-described problem and provide a transmission capable of swiftly shifting gear by moving a shift fork immediately when a clutch is disengaged.

In order to achieve the above-described object, the present invention is characterized firstly by a transmission for changing a ratio of a rotational number of a power source and a rotational number of an output shaft by shifting a gear train provided between the power source and the output shaft by moving a shift fork, the transmission comprising a shift drum for moving the shift fork, a clutch provided between the power source and the gear train, a shift spindle for urging the shift drum and the clutch, intermittent driving means provided between the shift spindle and the shift drum for starting to operate from a first operation angle of the shift spindle and pivoting the shift drum by a predetermined angle and urging means provided between the shift spindle and the shift drum for starting to urge the shift drum in a pivoting direction at a third operation angle smaller than a second operation angle of the shift spindle at which disengagement of the clutch is finished.

According to the first aspect, when the shift spindle is pivoted, the clutch is disengaged at the second operation angle. Further, prior to disengaging the clutch, by the urging means, preload starts applying to the shift drum from the third operation angle. Therefore, when the clutch is disengaged, the shift drum is immediately pivoted by the predetermined angle and the gear train is shifted.

Further, the present invention is secondly characterized in that urging force by the urging means is released at an operation angle larger than the first operation angle. According to the second aspect, after reaching the first operation angle, that is, after starting to pivot the shift drum by the intermittent driving means, the shift drum follows pivoting of the shift spindle.

Further, the present invention is thirdly characterized in further providing drum position detecting means for detecting a pivoting angle of the shift drum. According to the third aspect, even when the shift drum is rotated by the urging means before reaching the first operation angle, the position of the shift drum can be recognized and accordingly, various control based on the angle detection result can surely be carried out in correspondence with the position of the shift drum.

Further, the present invention is fourthly characterized in further providing a motor for driving the shift spindle. According to the fourth aspect, in the apparatus in which the clutch is disengaged and the gear is shifted by the motor, the clutch is switched surely in a short period of time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
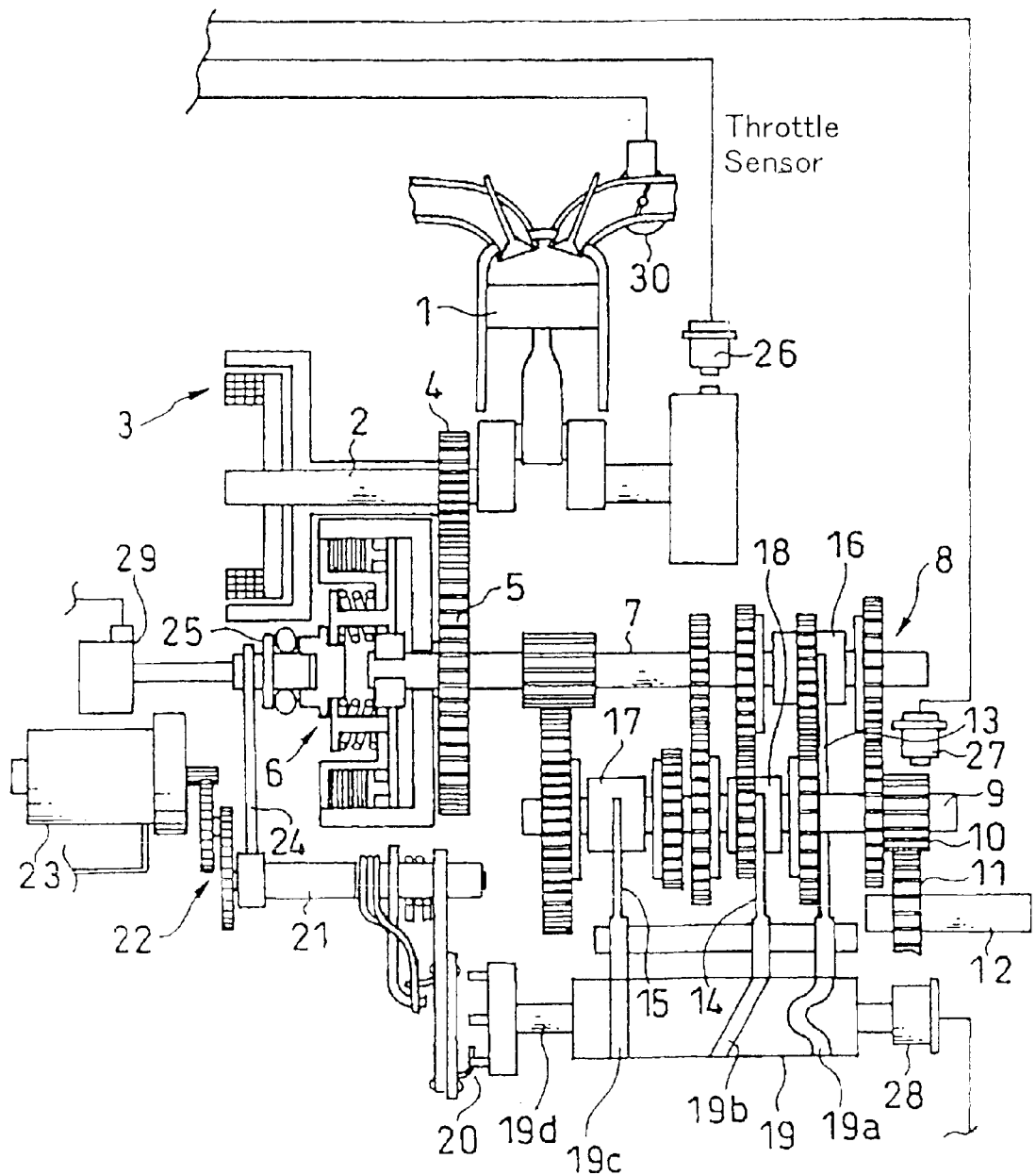
FIG. 2 is a view showing constitution of essential portions of an engine including the transmission according to the one embodiment of the present invention.

An explanation will be given of an embodiment of the present invention in reference to the drawings as follows. FIG. 2 is a constitution view of essential portions for an engine including an electric transmission according to an embodiment of the present invention. In the drawing, a crank shaft 2 connected to a piston 1 is coupled to a positions/capacity conversion clutch 6 via a centrifugal clutch 3 and gears 4 and 5. Output of the clutch 6 is coupled to a first shaft 7 of the transmission and the first shaft 7 is coupled to a second shaft 9 via a gear train 8 comprising a plurality of gears. Further, the second shaft 9 is coupled to an output shaft 12 via gears 10 and 11. The first shaft 7 and the second shaft 9 are arranged with connecting members (sliders) 16, 17 and 18 moved on the shafts by forks 13, 14 and 15. The respective sliders 16 through 18 are provided with dowels respectively on both ends thereof in the axial direction and side faces of the gears disposed on both sides of the respective sliders 16 through 18, are respectively provided with slits coupled to the dowels.

End portions of the forks 13 through 15, that is, end portions thereof from sides opposed to sides engaged with the sliders, are engaged with cam grooves 19a, 19b and 19c formed along a circumference of a shift drum 19. A shaft 19d of the shift drum 19 is coupled to a shift spindle 21 as a shift operation input member via an index mechanism portion 20.

The shift spindle 21 is coupled to a motor 23 via a gear train 22. Further, the shift spindle 21 is attached with a clutch arm 24 and the clutch arm 24 is engaged with an operating shaft 25 of the position/capacity conversion clutch 6. Further, an engine rotation number sensor 26 is provided to be opposed to the crank shaft 2 and a vehicle speed sensor 27 is provided to be opposed to one of the gears of the second shaft 9. Further, the shaft 19d of the shift drum 19 is provided with a drum position sensor 28, the operating shaft 25 engaged with the clutch arm 24 is provided with a spindle angle sensor 29 and an intake pipe is provided with a throttle sensor 30. Outputs of the respective sensors are connected to ECU, not illustrated. A position of switching gears of the transmission can be detected by the drum position sensor 28 and the gear position can be displayed at, for example, a display apparatus.

In the above-described constitution, in shift operation the motor 23 is urged and the shift spindle 21 is pivoted. Then, the clutch lever 24 is pivoted, the clutch 6 is disengaged, the index mechanism portion 20 is urged and the shift drum 19 is intermittently fed. As a result, the forks 13 through 15 are moved and the gears of the gear train 8 are shifted and a transmission gear ratio in accordance with shift of the gears is provided.

Figure 1:
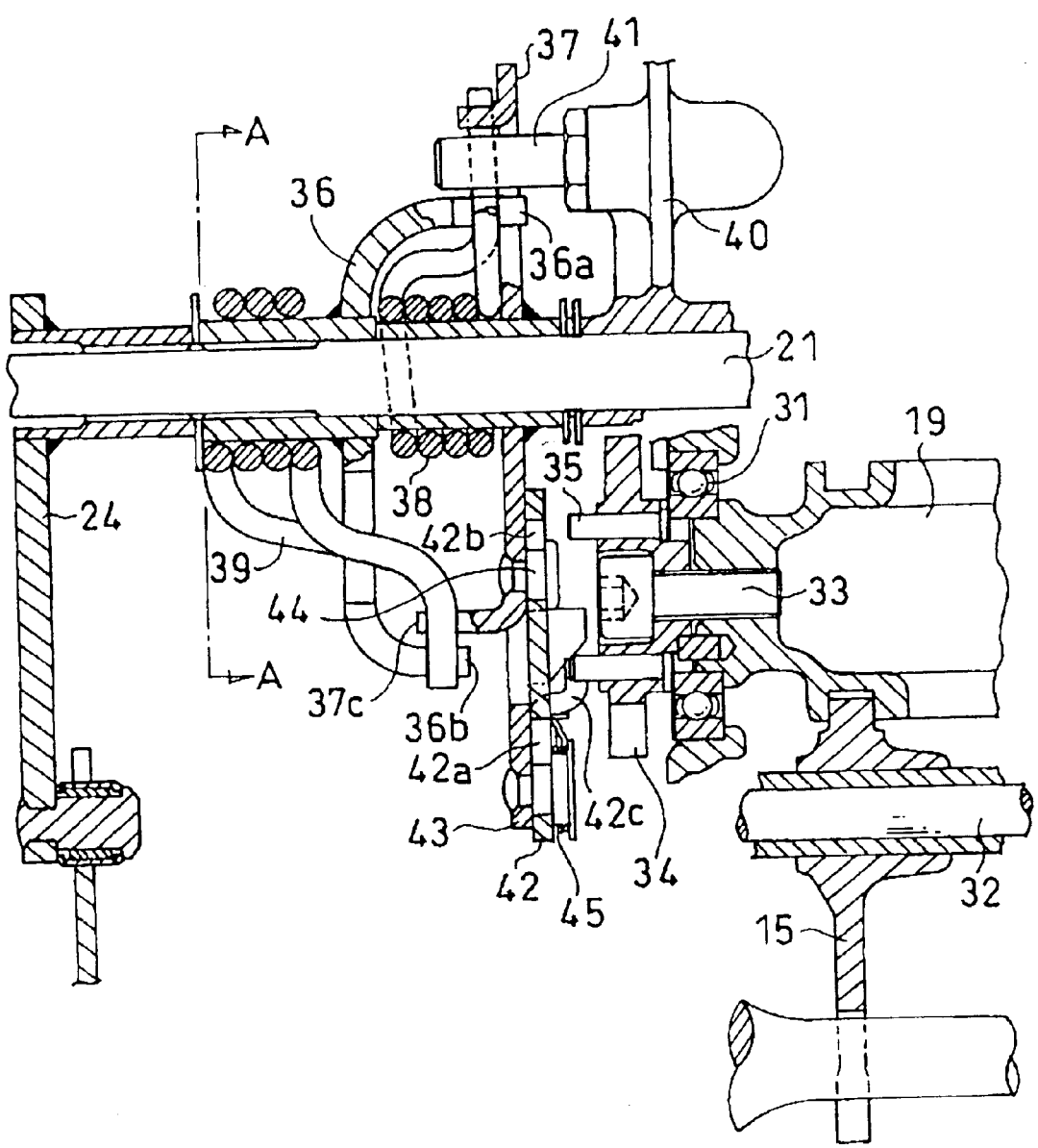
FIG. 1 is a sectional view of essential portions of a transmission according to an embodiment of the present invention.
Figure 3:
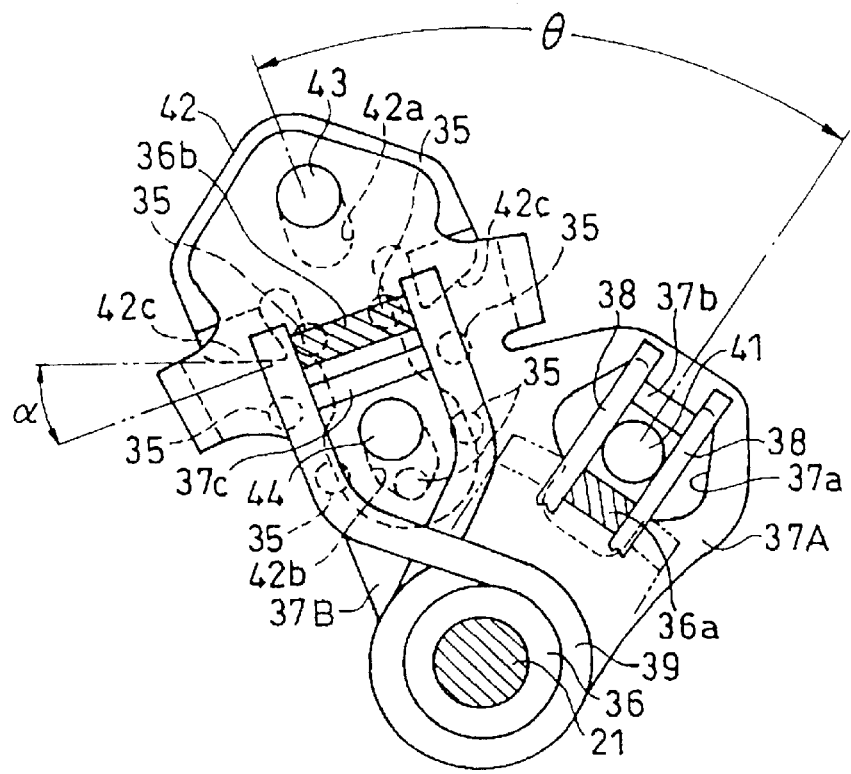
FIG. 3 is view taken along a line A—A of FIG. 1 showing an index mechanism of a shift drum.
Figure 4:
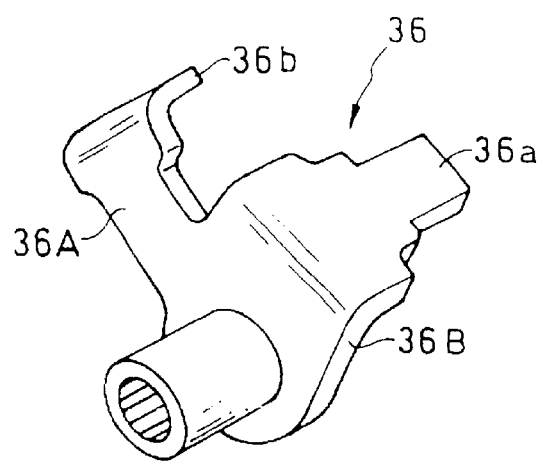
FIG. 4 is a perspective view showing a sub arm of the index mechanism.

FIG. 1 is a sectional view of the index mechanism portion, that is, the intermittent feed mechanism portion 20 of the shift drum 19 and FIG. 3 is a view taken along a line A—A of FIG. 1 and is a view showing essential portions of the preload arm. Further, FIG. 4 is a perspective view of a sub arm constituting a portion of the preload arm. In FIG. 1 through FIG. 4, the shift drum 19 is rotatably supported by a bearing 31 and a bearing, not illustrated, paired with the bearing 31. The fork 15 is slidably attached on a fork guide 32. An end portion of the shift drum 19 is attached with a shift plate 34 by a bolt 33. The shift plate 34 is fitted with index pins 35 at equal angular intervals centering on the bolt 33.

On the shift spindle 21, the clutch arm 24, a sub arm 36 and a master arm 37 are arranged in this order from left of FIG. 1. The clutch arm 24 and the sub arm 36 are spline-coupled to the shift spindle 21 and are pivotable integrally to each other. In the meantime, the master arm 37 is pivotably supported in a circumferential direction on the shift spindle 21 such that the master arm 37 can follow the sub arm 36 via a return spring 38 and a preload spring 39. Further, the sub arm 36 and the master arm 37 respectively form arm portions extended in two directions by an angle θ centering on the shift spindle 21 to thereby constitute a V-like shape as a whole, in FIG. 1, the angle θ is developed to 180 θ to facilitate understanding.

One arm portion (short arm portion) 37A of the master arm 37 is provided with a window 37a, the window 37a is loosely fitted with a return pin 41 provided to project from a casing 40 and is loosely fitted with a bent end portion 36a of one arm portion (short arm portion) 36A of the sub arm 36. An upper edge of the window 37a of the master arm 37 is cut to rise to form a hook 37b and side face portions of the return pin 41, the hook 37b and the bent end portion 36a are elastistically sandwiched by two end portions of the return spring 38 loosely fitted to a boss portion of the master arm 37.

In the meantime, a central portion of the other arm portion (long arm portion) 37B of the master arm 37, is formed with a hook 37c by cutting to rise thereof and side face portions of the hook 37c and a bent end portion 36b of other arm portion (long arm portion) 36B of the sub arm, are elastistically sandwiched by two end portions of the preload spring 39 a coil portion of which is loosely fitted to a boss portion of the sub arm 36.

On one face, a side of the shift drum 19 of the master arm 37, is attached with a plate (referred to as 'feed plate') 42 engaged with the index pins 35. The feed plate 42 is provided with long holes 42a and 42b. A center and a front end in the longitudinal direction of the long arm portion 37B of the master arm 37, are respectively fixedly attached with stepped guide pins 43 and 44 and the guide pins 43 and 44 are respectively loosely fitted to the long holes 42a and 42b of the feed plate 42. Therefore, the feed plate 42 is displaceable in the longitudinal direction of the long arm portion 37B by the guide pins 43 and 44. The feed plate 42 is formed with hooks 42c cut to rise to the side of the index plate 34. When the master arm 37 is pivoted which centers on the shift spindle 21, the front ends of the hooks 42c are engaged with the index pins 35 and pivots the shift drum 19 by a predetermined angle.

Further, a surrounding of the index plate 34 is provided with a plurality of recess portions, that is, cam grooves at predetermined angular intervals and a drum stopper, not illustrated, is elastically pressed and engaged to the cam grooves. The position of the shift drum 19 is held by press force of the drum stopper and therefore, the shift drum 19 is pivoted by urging the index pins 35 by force larger than the press force by the feed plate 42.

The guide pin 43 is provided with a return spring 45 for urging the feed plate 42 in a direction of the center of the shift spindle 21. As shown by FIG. 3, the hooks 42c of the feed plate 42 are formed in a shape of a flange having an opening set to sandwich two pieces of the index pins 34 contiguous to each other and the front end of the hook 42c is provided with an escape angle α for evading the index pin 35 when the master arm 37 is pivoted and returned in one direction.

Figure 5:
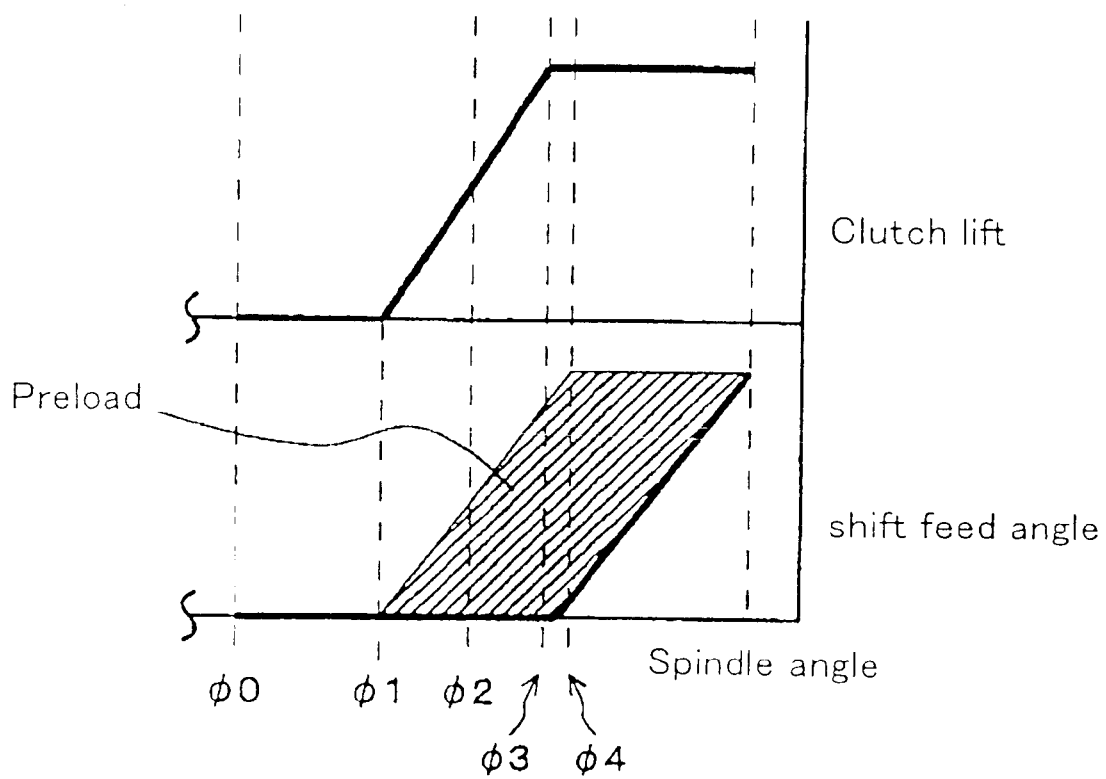
FIG. 5 is a diagram showing a relationship among an operation angle of a shift spindle, a shift feed angle and a clutch lift.

FIG. 5 is a diagram showing a relationship among an angle of the shift spindle 21, a shift feed angle and a clutch lift. An explanation will be given of the operation of the transmission having the above-described constitution. When the motor 23 is urged and the shift spindle 21 is pivoted (initial angle φ0), the sub arm 36 is pivoted in accordance therewith and the clutch arm 24 is also pivoted. When the shift spindle 21 is pivoted to an angle φ1, the clutch 6 starts lifting (start disengaging) and reaches a lift maximum value at an angle φ3, that is, the clutch 6 finishes as disengaged.

In the meantime, even when the sub arm 36 is pivoted, since a width of the bent end portion 36b of the sub arm 36 is narrower than a width of the window 37a of the master arm, the master arm 37 is not pivoted immediately. That is, there is a gap between the bent end portion 36b and the window 37a. Therefore, even when the sub arm 36 is pivoted, the master arm 37 is not pivoted with the bent end portion 36b of the sub arm 36 in one-to-one relationship until the gap is reduced against the return spring 38 and a side portion of the bent end portion 36b and an inner face of the window 37a are brought into contact with each other. Therefore, when the shift spindle 21 starts pivoting, regardless of pivoting of the shift spindle 21, the shift feed angle is not advanced. This interval is a state in which the master arm 37 is applied with preload by the preload spring 39. The preload by the preload spring 39 is set such that the master arm 37 starts to be loaded from an angle φ2 (third operation angle) smaller than the angle φ3 (second operation angle).

Although by the preload, the index pins 35 are pressed by the hooks 42c, the shift drum 19 is not rotated since the dowels of the sliders 16, 17 and 18 are coupled to the slits of the contiguous gears by large coupling force until the clutch 6 is disengaged. Therefore, until the clutch 6 is disengaged, the preload by the preload springs 39 is supplied to the shift drum 19 via the index pins 35.

The clutch 6 is disengaged during a time period until the sub arm 36 and the master arm 37 start pivoting in the one-to-one relationship, that is, until an angle φ4 at which the last motion is finished. When the clutch 6 is disengaged, the coupling force between the dowels of the sliders 16 through 18 and the slits of the contiguous gears is reduced, the shift drum 19 is immediately rotated by rotational force of the preload spring 39 and switch of the gears is finished. This way, when the coupling force between the dowels and slits are reduced by disengaging the clutch 6, thereafter, the gears are switched in a short period of time. The gears are switched during a time period in which gears are rotated by inertia and the dowels and slits are easily coupled. Further, the shift time period is shortened and accordingly, the running performance of the vehicle is improved.

After shifting the gears, the master arm 37 is returned by the return spring 38, at this occasion, the hooks 42c of the feed plate 42 are brought into contact with the index pins 35 disposed in a direction opposed to the shift direction. However, the feed plate 42 is pushed up by the faces of the hooks 42c having the escape angle α, which ride over (that is, evade) the index pins 35 and return to the initial positions. In this way, when the shift becomes necessary, by pivoting the motor 23 by the predetermined angle, the shift drum 19 is pivoted and the gears are switched.

As apparent from the above-described explanation, according to the present invention, successively to disengaging the clutch, switching of the gears, that is, the shift operation is carried out swiftly. Therefore, the shift is finished in a short period of time and the clutch is switched smoothly.

Particularly, according to the first aspect, the shift spindle starts pivoting and prior to disengaging the clutch, the shift drum starts being applied with a preload. Therefore, when the clutch is disengaged, the shift drum is immediately pivoted by the predetermined angle and the gear train is switched.

Further, according to the second aspect, after starting to pivot the shift drum by the intermittent driving means, the shift drum follows pivoting the shift spindle and accordingly, stable shift operation is carried out.

Further, according to the third aspect, even when the shift drum is rotated by the urging means before, for example, the first operation angle is reached, the position of the shift drum can be recognized and therefore, various control based on the angle detection result can be carried out surely in correspondence with the position of the shift drum.

Further, according to the fourth aspect, in the apparatus disengaging the clutch and switching the gears by the motor, the clutch is switched in a short period of time and surely.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission for changing a ratio of a rotational frequency of a power source and a rotational frequency of an output shaft by switching a gear train provided between the power source and the output shaft by moving a shift fork, said transmission comprising:

a shift drum for moving the shift fork;

a clutch provided between the power source and the gear train;

a shift spindle for urging the shift drum and the clutch;

intermittent driving means provided between the shift spindle and the shift drum for starting to operate from a first operation angle of the shift spindle and pivoting the shift drum by a predetermined angle; and urging means provided between the shift spindle and the shift drum for starting to urge the shift drum in a pivoting direction at a third operation angle smaller than a second operation angle of the shift spindle at which disengagement of the clutch is finished, wherein the intermittent driving means includes:

a clutch arm and a sub arm fixed to the shift spindle;

a master arm pivotably supported in a circumferential direction on the shift spindle; and a preload spring and a return spring, each of the springs being wrapped around the shift spindle.

2. The transmission according to claim 1, wherein the urging means is released at an operation angle larger than the first operation angle.

3. The transmission according to claim 1, further comprising a drum position detecting means for detecting a pivoting angle of the shift drum.

4. The transmission according to claim 1, further comprising a motor for driving the shift spindle.

5. The transmission according to claim 1, wherein the clutch arm and the sub arm are spline-coupled to the shift spindle and are pivotably integral with each other.

6. The transmission according to claim 1, wherein the sub arm and the master arm extends in two directions by an angle that centers on the shift spindle to thereby constitutes a V-like shape.

7. The transmission according to claim 1, wherein the master arm further comprises a short arm portion including a window, the window loosely fitted with a return pin to project from a casing.

8. The transmission according to claim 7, wherein the master arm is loosely fitted with a bent end portion of a short arm portion of the sub arm.

9. The transmission according to claim 7, wherein the master arm further comprises a long arm portion, and the long arm portion of the master arm is formed with a hook.

10. The transmission according to claim 1, wherein a side of the shift drum of the master arm is attached with a feed plate which engages with index pins, and the plate is provided with long holes.

11. The transmission according to claim 10, wherein the master arm is fixedly attached with guide pins, and the guide pins are loosely fitted to the long holes of the plate.

12. The transmission according to claim 11, wherein the guide pins are further provided with the return spring for urging the plate in a direction of the center of the shift spindle.

13. The transmission according to claim 10, wherein the feed plate is formed with hooks to raise a side of an index plate, and the hooks engage with the index pins and pivots the shift drum by a predetermined angle when the master arm pivotably centers on the shift spindle.

14. The transmission according to claim 13, wherein the hooks of the plate are formed in a shape of a flange having an opening set to sandwich two pieces of the index pins contiguous to each other and a front end of the hook is provided with an escape angle for evading the index pin when the master arm is pivoted and returned in one direction.

15. The transmission according to claim 13, wherein the index pins are pressed by the hooks to prevent rotation of the shift drum through dowels of a slider coupled to slits of the gears by a large coupling force until the clutch is disengaged.

16. The transmission according to claim 15, wherein when the coupling force between the dowels of the sliders and the slits of the gears is reduced, the shift drum is immediately rotated by rotational force of the preload spring and switch of the gears is finished.

17. The transmission according to claim 1, wherein the clutch is disengaged during a time period until the sub arm and the master arm start pivoting in a one-to-one relationship until a fourth operation angle is reached, at which time a last motion is finished.

18. The transmission according to claim 1, the shift drum is provided with a drum position sensor.

19. The transmission according to claim 1, wherein the clutch arm is provided with a spindle angle sensor.

20. A transmission for changing a ratio of a rotational frequency of a power source and a rotational frequency of an output shaft by switching a gear train provided between the power source and the output shaft by moving a shift fork, said transmission comprising:

a shift drum for moving the shift fork;

a clutch provided between the power source and the gear train;

a shift spindle for urging the shift drum and the clutch;

intermittent driving means provided between the shift spindle and the shift drum for starting to operate from a first operation angle of the shift spindle and pivoting the shift drum by a predetermined angle; and urging means provided between the shift spindle and the shift drum for starting to urge the shift drum in a pivoting direction at a third operation angle smaller than a second operation angle of the shift spindle at which disengagement of the clutch is finished, wherein the intermittent driving means includes:
 a clutch arm and a sub arm fixed to the shift spindle;
 a master arm pivotably supported in a circumferential direction on the shift spindle; and
 a preload spring and a return spring which enable the master arm to follow the sub arm.

21. The transmission according to claim 20, wherein the urging means is released at an operation angle larger than the first operation angle.

* * * * *